United States Patent [19]

Cornwell et al.

[11] Patent Number: 4,913,919

[45] Date of Patent: Apr. 3, 1990

[54] COATING COMPOSITION FOR COMESTIBLE PRODUCTS

[75] Inventors: Chris J. Cornwell, Coppell, Tex.; Amy L. Joseph, New Fairfield, Conn.; Stephen L. Rice, Lewisville, Tex.

[73] Assignee: Frito-Lay, Inc., Dallas, Tex.

[21] Appl. No.: 279,724

[22] Filed: Dec. 5, 1988

Related U.S. Application Data

[63] Continuation of Ser. No. 931,861, Nov. 18, 1986.

[51] Int. Cl.[4] ............................................... H23P 1/08
[52] U.S. Cl. ..................................... 426/94; 426/289; 426/302; 426/658
[58] Field of Search ................. 426/302, 808, 94, 103, 426/658, 98, 99, 293, 289

[56] References Cited

U.S. PATENT DOCUMENTS

| | | |
|---|---|---|
| 3,830,941 | 8/1974 | Luft et al. . |
| 4,053,650 | 10/1977 | Chino et al. . |
| 4,344,969 | 8/1982 | Youngquist et al. . |
| 4,379,171 | 4/1983 | Furda et al. . |
| 4,410,551 | 10/1983 | Comer .................................... 426/99 |
| 4,415,599 | 11/1983 | Bos ...................................... 426/578 |
| 4,455,333 | 6/1984 | Hong et al. . |
| 4,575,461 | 3/1986 | Friedman et al. . |
| 4,609,555 | 9/1986 | Becher et al. . |
| 4,645,674 | 2/1987 | Lang et al. ............................ 426/94 |
| 4,725,441 | 2/1988 | Porter et al. . |
| 4,822,626 | 4/1989 | Spanier et al. ........................ 426/94 |

OTHER PUBLICATIONS

Cereal Science Today, Oct. 1965, vol. 10, No. 9, pp. 508 and 510, Starch & Film Coating, C. H. Hullinger.

*Primary Examiner*—Donald E. Czaja
*Assistant Examiner*—D. Workman
*Attorney, Agent, or Firm*—Bernard, Rothwell & Brown

[57] ABSTRACT

The texture, flavor and/or color of comestible products may be modified by applying a high solids, aqueous coating composition to the surfaces thereof, which coating composition comprises from 10% to 40% by weight maltodextrin and from 10% to 40% by weight starch granules.

30 Claims, No Drawings

COATING COMPOSITION FOR COMESTIBLE PRODUCTS

CROSS REFERENCE TO RELATED APPLICATION

This application is a continuation of Ser. No. 931,861, filed Nov. 18, 1986.

BACKGROUND OF THE INVENTION

1. Field of the Invention

This invention relates to methods and compositions for use in producing comestible products having pleasing texture and flavor characteristics. In one aspect, the invention relates to the preparation of comestible products having crisp exterior textures and soft, chewy interior textures In other aspects, the invention relates to compositions and methods for applying and adhering topical materials which may be colored and/or flavored to comestible products and to the production of comestible products having exterior moisture and gas barriers which tend to maintain the organoleptic qualities of the product 2. Prior Art The textural attributes of comestible products are important determinants of their acceptance by consumers. This is particularly true of snack food items such as potato chips, cookies and the like, in which texture plays an important role in the consumer's perception of the product Snack food manufacturers have learned that consumers are particularly fond of snack food items that display textural dichotomy or variety; that is, foods which exhibit two or more distinctly different textures within the same food item Textural variety may be combined with flavor variety to produce a product having pleasing organoleptic properties.

One method of imparting texture, flavor and color variety is to apply particulate topping materials to a comestible product An example of such an application is described in U.S. Pat. No. 4,609,555 to Becher et al., which describes the application of particulate topping materials to baked crackers. A problem which has been encountered when topical materials are applied to snack foods is that the topping materials may tend to fall off the product during shipping or handling and they frequently tend to rub off onto the hands of the consumer.

Various coating materials have been applied to snack food items in order to impart desirable surface characteristics, to act as carriers for flavoring materials or to adhere particulate toppings to the product. Generally, the coating materials used have incorporated fats or oils An example of such a coating is set forth in U.S. Pat. No. 3,830,941, which describes the application of an edible oil-in-water emulsion to the surfaces of snack foods While such coatings may impart some desirable characteristics, the application of fats or oils to the product is undesirable if one wishes to control the caloric content of the snack food item. Furthermore, if the coating is fat- or oil-based, it may impart a greasy feel in the hand or the mouth. Aqueous coatings of the prior art tend to have high water contents Consequently, they require relatively large amounts of energy for drying. Additionally, undesirably large amounts of water may be absorbed into the substrate from the coating which can cause the substrate to become soggy.

U.S. Pat. Nos. 4,344,969 to Youngquist et al. and 4,455,333 to Hong et al. are both directed to methods of producing cookies having textural dichotomy. In particular, the cookies produced are said to have crisp, friable exteriors and soft, ductile interiors U.S. Pat. No. 4,455,333 discloses a method of preparing cookies having regions of crispy texture and regions of chewy texture which involves the use of layered doughs, each layer incorporating different types of sugars U.S. Pat. No 4,344,969 describes a process for making cookies having textural dichotomy which involves preparing a cookie dough containing a carbohydrase enzyme and a readily crystallizable sucrose-containing component, at least a part of which can act as a substrate for the enzyme to produce crystallization-resistant sugars; inactivating the enzyme in a portion of the dough; activating the enzyme in another portion of the dough; and baking the dough. While the two aforementioned patents describe methods which are said to produce cookies having dual textures, the procedures described are undesirably complicated. A further drawback of these procedures is that they rely on sugar crystallization to produce dual texture. Since this crystallization takes place as the cookie equilibrates, the cookie does not take on the desired dual texture for a substantial period of time after baking.

SUMMARY OF THE INVENTION

This invention provides methods and compositions for modifying the texture of comestible products. In accordance with the invention, the texture of the comestible product is modified by applying to the product a coating composition which is a high solids content aqueous suspension, having a solids content of at least 40% by weight. The composition comprises from 10% to 40% by weight maltodextrin and from 10% to 40% by weight starch granules.

The coating composition can be applied to a comestible product to impart a crisp outer texture. After drying and setting, the coating acts as a gas and moisture barrier which tends to maintain the inner textural characteristics of the product and prolong its shelf life. The coating composition can also be used as a carrier for a topical flavoring and/or colorants, and also as a means of adhering particulates to the surface of the product. Ruboff of topical seasonings can be reduced, either by using the coating composition as an adhesive to bind the seasoning material to a comestible substrate or by applying the coating composition as a topcoat over the seasoning. Due to the high solids content of the coating composition, relatively little energy is required to dry and set the coating. The high solids content of the coating also minimizes the amount of water which can be absorbed from the coating into the substrate. A major advantage of the coating composition of the invention is that it can be fat- and oil-free. Consequently, it is compatible with the preparation of low-fat snack foods.

The coating composition can be employed to obtain dual texture in snack food products, for example, baked goods such as cookies. Application and drying of the coating composition imparts a crisp texture to the outer portion of the product, while the texture of the inner portion remains essentially unchanged. If desired, a second coating composition can be applied over the initial coating composition to further modify the texture and/or appearance of the product. For example, in the case of a baked snack product, a second coating composition, comprising modified starch, water, shortening, emulsifier and a leavening agent can advantageously be applied on top of the material coating composition. The second coating composition reduces surface gloss and produces limited surface cracking on the product, thereby allowing steam to vent during baking and improving surface appearance.

DETAILED DESCRIPTION OF THE PREFERRED EMBODIMENTS

The coating composition which is employed to modify the surface texture of comestible products is a high solids (at least 40% by weight) aqueous suspension comprising from 10% to 40% by weight maltodextrin and from 10% to 40% by weight starch granules. Preferably, the composition comprises from 15% to 33% by weight maltodextrin and from 15% to 36% by weight starch granules.

Maltodextrins, as those skilled in the art are aware, are partial hydrolyzates of starches. While the maltodextrin used in the invention may be derived from any known food starch, maltodextrins derived from corn starch are preferred Maltodextrins can be classified on the basis of dextrose equivalent (D.E.) values. The term "D.E." refers to the reducing sugars content of the starch hydrolyzates expressed as percent dextrose as measured by the Luff-Schoorl method (NBS Circular C-40, page 195 as appearing in "Polarimetry Saccharimetry, and the Sugars" by Frederick J. Bates and Associates). Starch hydrolyzates having D.E. values up to about 20 are considered to be maltodextrins, while those having D.E. values above about 20 are considered to be corn syrups. Preferably, the maltodextrin employed in the invention has a D.E. value from 10 to 20.

As used herein, the term "starch granules" refers to a native or chemically modified non-pregelatinized starch that is water wettable. While it is preferred to employ wheat starch granules, other starches including, for example, potato, corn or rice starch can also be employed.

The surface appearance and gas/moisture permeability properties imparted by the coating composition can be varied by adjusting the ratio of maltodextrin to starch granules. At a maltodextrin-to-starch weight ratio of about 1:1, the coating dries well to produce a smooth, slightly blistered surface finish At a ratio below about 1:1, the dried coating is smoother and exhibits less gloss. At a ratio greater than about 1:1, the dried coating contains many blisters, which increase the volume of the coating. Preferably, the weight ratio of maltodextrin to starch granules is from 0.7 to 1.0.

If desired, the texture imparted by the coating can be varied by the addition to the coating composition of proteinaceous substances, which have a tenderizing effect on the resulting coating. The proteinaceous substance can be present in an amount from about 2% to 20% by weight of the coating composition. A preferred proteinaceous substance for use in the composition is egg white powder. Other proteinaceous substances would be obvious to those skilled in the art and include soy, whey, whole egg and cheese powders.

If it is desired to employ the coating composition as a carrier material for flavoring agents, then a flavoring agent can also be present. Any known flavoring agent which can be incorporated in the aqueous suspension can be used. One can mention, as merely exemplary of such flavorings, cheese powder, sour cream and onion, bacon and cheese, cheddar and nacho flavorings, vanilla extract and tomato powder. The flavoring agents, when present, are employed in an amount up to about 40% by weight of the composition.

Other conventional food additives which are capable of being dispersed in the suspension can also be employed in known effective amounts. For example, a coloring agent such as caramel coloring, FD&C yellow #6, FD&C red #40 or #9195 Brown Lake blend "R" may be present in an amount up to about 2% by weight. When caramel coloring is used, a pregelatinized starch advantageously is employed in an amount of about 1% by weight as a dispersing aid to produce a smooth suspension.

Although fat- or oil-based components may be present in the coating composition with or without emulsifiers, a major advantage of the coating composition of the invention is the fact that it can be essentially fat-free. By "fats" is meant any partially or completely hydrogenated fatty acid triester of glycerol.

The balance of the composition comprises water in an amount sufficient to achieve the desired solids content. The solids content of the coating composition is at least 40%. While there is no strict upper limit on the solids content, the coating must remain sufficiently fluid to be applied by the desired coating means. Generally, the solids content will not exceed about 73%.

The coating composition can be prepared by any conventional means which produces a smooth suspension. Preferably, it is prepared by admixing the solid ingredients, using any suitable mixing means, prior to addition of the water. Additional mixing is then applied until a smooth suspension is obtained. Alternatively, all or a portion of the maltodextrin can be provided in the form of an aqueous solution, which is premixed with the raw starch granules and other ingredients prior to adding the remainder of the water to achieve the desired solids content in the composition.

The coating composition of the invention can be applied to a comestible product by any conventional means which coats all or a portion of the surface of the product. For example, the coating composition can be applied by spraying, brushing, curtaining, pouring or dipping. The composition can be applied to products such as corn chips, potato chips, puffed farinaceous products, tortilla chips and baked goods such as cookies. It can be applied to impart surface crispness; for the purpose of acting as a carrier for a topical seasonings; or as means of adhering particulate seasonings to the surfaces of the product. The coating composition can be applied before or after cooking the comestible product, depending on the purpose for which it is applied. In the latter case, the coated comestible product is subjected to a sufficient amount of heat to dry and set the film. Due to its high solids content, the film dries quickly, with relatively little water passing into the product. Generally, the coating dries in about 2 to 10 minutes at a temperature of 350° F. to 400° F.

In one embodiment of the invention, the coating composition is employed to prepare a cookie having a crisp outer texture and a soft, chewy inner texture. A cookie dough is first prepared from conventional ingredients including sugar, flour, water and flavoring agents, in the usual known amounts. The cookie dough is prepared and is formed into cookie preforms. The preforms are then coated with the previously described aqueous coating composition, using any convenient means such as spraying, brushing or dipping. The coated preform can then be baked to provide a cookie having a crisp exterior and a soft chewy interior. Due to the gas and moisture transmission properties of the coating, the cookie retains its textural properties for a substantial period of time.

If desired, a second coating composition can be applied over the initial coating for the purpose of further modifying the surface appearance of the product. The second coating composition can be another composition as defined above or it can be a different coating composition selected to impart desired properties.

For example, a second coating composition containing a modified starch, such as Dry-Flo ® starch, water, shortening, high fructose corn syrup, a chemical leavening agent such as ammonium bicarbonate or sodium bicarbonate and an emulsifier advantageously can be applied over the initial coating in the preparation of a baked snack such as a cookie. Application of this second coating composition causes limited surface cracking to occur during the baking cycle, thus allowing steam to escape. It also reduces surface gloss in the baked product.

The coating composition of the invention can also be used to prepare particulate flavoring or coloring materials, for inclusion in comestible products. The coating composition, containing a flavoring and/or coloring material, is formed into sheets, which are dried and comminuted to produce particulates. Conventional sheeting and drying equipment, such as drum dryers can be used for this purpose. Drum dryers are heated pairs of counter-rotating drum rollers between which the high solids composition is passed. The heating and compressing action of the rollers removes sufficient water from the high solids composition to form a sheet, which is then comminuted to the desired particle size. The particles can then be incorporated, for example, into a potato dough which is formed and fried to produce a potato chip which has the appearance and/or flavor of included pieces of potato peel, cheese, etc.

The following examples are intended to illustrate further the practice of the invention and are not intended to limit its scope in any way.

EXAMPLES 1–10

Coating compositions were prepared from the following ingredients:

then added and mixing was continued until a smooth dispersion was obtained.

EXAMPLE 11

The coating composition of Example 1 was brushed onto the surfaces of Lays ® brand potato chips. The coated potato chips were dried in an oven at 350° F. to 400° F. The coating simulated the appearance and texture of potato peel.

EXAMPLE 12

The coating composition of Example 2 was formed into a sheet and dried by passing the composition through a drum dryer with the gap between the heated rollers set at less than 1/16 inch. The dried sheet was broken into small pieces which were admixed with a potato dough. The potato dough was formed into chips and fried. The pieces of dried coating composition gave the appearance and texture of potato peel pieces in the fried chips.

EXAMPLE 13

The coating composition of Example 3 was mixed with a granola mix. The coated mixture was poured into a 9-inch baking pan and heated in an oven. After cooling, the product was cut into granola bars.

EXAMPLE 14

Bags of fresh O'Gradys ® brand potato chips were opened and the chips removed. The chips had a corrugated surface configuration. The composition of Example 4 was applied to the surfaces of the chips using a paint brush. The coated chips were then dried in an oven at 350° F. to 400° F. The cheese coating filled the recesses of the surface corrugations.

EXAMPLE 15

The coating composition of Example 5 was applied to the surfaces of potato chips and dried in a manner similar to that described in Example 14 and dried parsley pieces were sprinkled onto the topping prior to drying. The product exhibited a sour cream flavor.

| Example No. | Parts by Weight | | | | | | | | | |
|---|---|---|---|---|---|---|---|---|---|---|
| Ingredient | 1 | 2 | 3 | 4 | 5 | 6 | 7 | 8 | 9 | 10 |
| Ingredient | | | | | | | | | | |
| Maltodextrin solution, 40% in water, D.E. 15 | 50.0 | 46.7 | 50.0 | 38.5 | 60.8 | — | — | — | — | — |
| Maltodextrin solution, 70% in water, D.E. 15 | — | — | — | — | — | 34.0 | 36.3 | 32.9 | 30.4 | — |
| Starch granules, #75 native | 30.0 | 28.0 | 30.0 | 15.4 | 24.3 | 34.0 | 36.3 | 32.9 | 30.4 | 33.3 |
| Maltodextrin powder, D.E. 15 | 10.0 | 9.3 | 10.0 | — | — | — | — | — | — | 33.3 |
| Water | — | 9.3 | — | 19.2 | — | 24.9 | 25.3 | 24.7 | 38.0 | 33.3 |
| Caramel coloring, Sethness #858 | 1.0 | 2.8 | 1.0 | — | — | — | 0.2 | — | — | — |
| High fructose corn syrup | 3.0 | 2.8 | 3.0 | — | — | — | — | — | — | — |
| Whole egg powder | 3.0 | 2.8 | 3.0 | 2.3 | — | 1.4 | 1.5 | 1.3 | 1.2 | — |
| Pregelatinized starch | 1.0 | 0.9 | 1.0 | — | — | — | — | — | — | — |
| Flavoring and/or coloring agent | — | — | — | 24.7[1] | 12.4[2] | 5.7[3] | 0.2[4] | 8.2[5] | — | 0.025[6] |

[1] Cheese powder, Kraft #96331 (23.1 p.b.w.), enzyme modified cheese #36129, Mid-American Co., (0.8 p.b.w.), salt (0.8 p.b.w.)
[2] Sour cream seasoning, National #9072-768 (12.2 p.b.w.), titanium dioxide (0.2 p.b.w.)
[3] Cheese powder, Beatrice Chez Tone 111R
[4] FD&C #6 (0.1 p.b.w.), FD&C #40 (0.1 p.b.w.)
[5] Doritos ® nacho cheese seasoning
[6] FD&C #6, #9195 Brown Lake blend "R"

In each of Examples 1–10, the ingredients other than water were mixed thoroughly, any additional water was

EXAMPLE 16

The coating composition of Example 6 was applied to the surfaces of Doritos ® brand toasted corn chips using a paint brush and dried in an oven in a manner similar to that of Example 14 to impart a cheese topping.

EXAMPLE 17

The coating composition of Example 7 was applied to the surfaces of Doritos ® brand toasted corn chips and to the surfaces of Toppels ™ brand crackers using a paint brush. The coated product were dried in an oven. The dried coating imparted a pizza-topping effect to the products.

EXAMPLE 18

The coating composition of Example 8 was applied to the surfaces of Doritos ® brand toasted corn chips using a brush and the coating was dried in an oven at 350° F. to 400° F. The dried coating imparted a nacho cheese flavor to the product.

EXAMPLE 19

Cheetos ® brand puffed corn snacks, which contained powdered seasonings on their surfaces, were placed in a tumbling drum. The coating composition of Example 9 was sprayed onto the product as a mist while the product was tumbled. The coating was also dried with hot air while the product was tumbled. The dried coating reduced crumbs and seasoning ruboff.

EXAMPLE 20

The coating composition of Example 10 was applied to the surfaces of a puffed farinaceous product. The coated product was passed through a tumbling drum as described in Example 19 and coated with potato chip crumbs, the coating acting as an adhesive. After drying, the coating reduced falloff of the potato chip crumbs from the product surfaces and enhanced the product texture.

EXAMPLE 21

A coating composition having about 72.7 weight percent solids content was prepared from the following ingredients.

| Ingredient | Weight Percent |
| --- | --- |
| Wheat starch granules | 27.3 |
| Maltodextrin, Maltrin ®-150, D.E. 15 | 27.3 |
| Whole egg powder | 2.7 |
| High fructose corn syrup | 2.7 |
| Pregelatinized starch | 0.9 |
| Water | 27.3 |
| Fried flavor, #2386-50-C, Fries & Fries | 11.8 |

A 40% (w/w) solution of maltodextrin in the water was prepared by mixing at 80° C. The solution was cooled to room temperature. The high fructose corn syrup was then added to the solution with thorough mixing. The remaining maltodextrin and other dry ingredients, except the flavoring, were premixed and added to the solution with thorough mixing. The flavoring material was then added with thorough mixing.

The coating composition which was prepared in this manner is suitable for application to a snack food, for example, a puff-extruded farinaceous product, to impart fried food flavor.

What is claimed is:

1. A coating composition for modifying the texture of a comestible product comprising an aqueous suspension having a solids content of at least 40%, said suspension comprising from 10% to 40% by weight maltodextrin and from 10% to 40% by weight starch granules.

2. A coating composition as claimed in claim 1 comprising from 15% to 33% by weight maltodextrin and from 15% to 36% by weight starch granules 3. A coating composition as claimed in claim 1 wherein the maltodextrin has a D.E. value from about 10 to 20.

4. A coating composition as claimed in claim 1 wherein the weight ratio of maltodextrin to starch granules is from 0.7 to 1.0.

5. A coating composition as claimed in claim 1 further comprising from 2% to 20% by weight of a proteinaceous substance.

6. A coating composition as claimed in claim 5 wherein the proteinaceous substance is whole egg powder.

7. A coating composition as claimed in claim 1 wherein the composition is devoid of fats.

8. A coating composition as claimed in claim 1 further containing up to 40% by weight flavoring agents.

9. A method of modifying the texture of a comestible product which comprises applying to the surfaces of a comestible product a composition comprising an aqueous suspension having a solids content of at least 40%, said suspension comprising from 10% to 40% by weight maltodextrin and from 10% to 40% by weight starch granules.

10. A method as claimed in claim 9 wherein the coating composition comprises from 15% to 33% by weight maltodextrin and from 15% to 36% starch granules.

11. A method as claimed in claim 9 wherein the maltodextrin has a D.E. value from 10 to 20.

12. A method as claimed in claim 9 wherein the weight ratio of maltodextrin to starch granules in the coating composition is from 0.7 to 1.0.

13. A method as claimed in claim 9 wherein the coating composition further comprises from 2% to 20% by weight of a proteinaceous substance.

14. A method as claimed in claim 13 wherein the proteinaceous substance is whole egg powder.

15. A method as claimed in claim 9 wherein the coating composition is devoid of fats.

16. A method as claimed in claim 9 wherein the coating composition contains up to 40% by weight flavoring agents.

17. A comestible product having on its surface a coating of a composition comprising an aqueous suspension having a solids content of at least 40%, said suspension comprising from 10% to 40% by weight maltodextrin and from 10% to 40% by weight starch granules.

18. A comestible product as claimed in claim 17 wherein the coating composition comprises from 15% to 33% maltodextrin and from 5% to 36% starch granules.

19. A comestible product as claimed in claim 17 wherein the maltodextrin has a D.E. value from 10 to 20.

20. A comestible product as claimed in claim 17 wherein the weight ratio of maltodextrin to starch granules is from 0.7 to 1.0.

21. A comestible product as claimed in claim 17 wherein the coating composition further comprises from 2% to 20% of a proteinaceous substance.

22. A comestible product as claimed in claim 21 wherein the proteinaceous substance is whole egg powder.

23. A comestible product as claimed in claim 17 wherein the coating composition is devoid of fats.

24. A comestible product as claimed in claim 17 wherein the coating composition contains up to 45% by weight flavoring agents.

25. A comestible product which is produced by drying the coating on the comestible product of claim 17.

26. A method as claimed in claim 9, 10, 11, 12, 13, 14, 15 or 16 further comprising drying the composition.

27. A comestible product as claimed in claim 17 wherein the coating is dried and imparts a crisp texture to the comestible product.

28. A comestible product as claimed in claim 17 wherein the coating is dried and comprises a moisture barrier to maintain inner textural characteristics of the product.

29. A dual texture snack food product comprising a dried coating composition of claim 1 disposed on a snack food item.

30. A dual texture snack food product as claimed in claim wherein the snack food item is a member selected from the group consisting of corn chips, potato chips, puffed farinaceous products, tortilla chips, and baked goods.

* * * * *

UNITED STATES PATENT AND TRADEMARK OFFICE
CERTIFICATE OF CORRECTION

PATENT NO. : 4,913,919
DATED : April 3, 1990
INVENTOR(S) : Chris J. Cornwell et al.

It is certified that error appears in the above-identified patent and that said Letters Patent is hereby corrected as shown below:

Column 1, line 17, insert -- . -- after "textures";

Column 1, line 30, insert -- . -- after "product";

Column 1, line 34, insert -- . -- after "item";

Column 1, line 36, insert -- . -- after "properties";

Column 1, line 39, insert -- . -- after "product";

Column 1, line 51, insert -- . -- after "oils";

Column 1, line 55, insert -- . -- after "foods";

Column 1, line 61, insert -- . -- after "contents";

UNITED STATES PATENT AND TRADEMARK OFFICE
CERTIFICATE OF CORRECTION

PATENT NO. : 4,913,919

DATED : April 3, 1990

INVENTOR(S) : Chris J. Cornwell et al.

It is certified that error appears in the above-identified patent and that said Letters Patent is hereby corrected as shown below:

Column 2, line 2, insert -- . -- after "interiors";

Column 2, line 6, insert -- . -- after "sugars";

Column 3, line 20, insert -- . -- after "preferred";

Column 3, line 43, insert -- . -- after "finish";

IN THE CLAIMS

Column 10, line 12, insert -- 29 -- after "claim".

Signed and Sealed this

Fourth Day of February, 1992

Attest:

HARRY F. MANBECK, JR.

*Attesting Officer*     *Commissioner of Patents and Trademarks*